Patented Mar. 27, 1928.

1,663,976

UNITED STATES PATENT OFFICE.

JUDSON A. DE CEW, OF NEW YORK, N. Y.

METHOD OF SIZING PAPER.

No Drawing.  Application filed September 22, 1926. Serial No. 137,167.

This present invention relates to an improved method of sizing paper by the use of a basic sulphate of alumina either initially or by converting any acid aluminum sulphate present in the stock to a basic sulphate before it can react with the rosin size.

The two materials that are universally used for the sizing of paper in the pulp are rosin soaps and sulphate of alumina.

Many methods have been devised for controlling the qualities of rosin soaps so that they will have special properties and reactions with the sulphate of alumina. It has always been assumed however, that sulphate of alumina is a standard material that always reacts the same way, and no treatments or methods are employed in paper sizing whereby the sulphate of alumina is given different properties and reactions with rosin size. It is a well recognized fact in the literature of paper making relating to sizing, that when sulphate of alumina is dissolved in water, it decomposes into acid and basic sulphates, the acid sulphate being ionized, so that its chemical activity is greater than the basic sulphate. In practice, this has been interpreted to mean that a definite economy can be effected in the use of sulphate of alumina by mixing it with water to a dilute solution before adding it to the beating engine.

Expensive alum diluting systems have been installed in many mills for the purpose of using this material in this state in which it shows the greatest acidity. When sulphate of ammonia is dissolved in the presence of the pulp fibres, it also decomposes with the formation of acid sulphates which react like free sulphuric acid, but not to the same extent as that which occurs when first diluting it with water.

I have discovered that there are many instances where the acid properties of sulphate of alumina are destructive to rosin sizing and have developed methods of overcoming these adverse reactions, all of which are based upon the principle of converting the acid sulphate of alumina into basic sulphate of alumina before the reaction with the rosin size takes place. The reason that acid sulphates are destructive to rosin sizing is that they act in the same way as sulphuric acid and form coarse precipitates of rosin.

In the application of my process described in Patent No. 1,585,469, I find that acid sulphate of alumina will destroy the sizing reaction, whereas perfect results are obtained when using basic sulphate of alumina. The water recovered from the paper machine always contains acid sulphate of alumina as the less soluble basic sulphate is retained by the cellulose fibres.

In order therefore, to have proper sizing reactions and to have uniform sizing results, it is necessary to convert any acid sulphates into basic sulphate of alumina at any part of the paper making process where such acid sulphates may exist.

When alum is put into aqueous solution before using it, I prepare it for the sizing reactions by treating the solution with soda or any other alkali, until the solution is sufficiently basic so that ionized sulphuric acid will be converted to basic sulphate of alumina. If dry alum is used in the beater, I may mix with it a sufficient amount of alkali to prevent the ionization of the $SO_3$ when the alum goes into solution. When acid sulphates from return waters are present in the pulp when the size is to be added, these are first converted into basic sulphates by treatment with any alkali, sodium carbonate or silicate of soda being the simplest materials to employ.

The product described in this specification as acid sulphate of alumina may be considered for the purpose of this invention to be any commercial alum or portion thereof that contains free acid or in solution. Any soluble alum when dissolved in a neutral water, will ionize with the formation of free acid. This free acid may be loosely combined with the sulphate forming an acid sulphate. Nearly all waste waters from the paper machine contain such acid sulphates. These acid sulphates are often composed of salts of lime or magnesium, such as calcium bisulphate or magnesium bisulphate, which are mixed with the acid sulphates of alumina.

The purpose of this invention therefore is to convert all acid sulphates regardless of what base is combined with them, into basic sulphates, which cannot react in the same way as sulphuric acid.

What I claim as my invention, is:

1. A method of sizing paper pulp, which consists in precipitating the rosin size with sulphate of alumina that has been made basic after it has been dissolved in water and before it can react with the size.

2. A method of sizing paper with sulphate of alumina, which consists in first dissolving the salt in water along with sufficient alkali to prevent decomposition, and then using this basic sulphate to pecipitate the rosin size.

3. A method of sizing paper, which consists in first treating the fibres with a solution of basic sulphate of alumina, which contains no acid sulphates and no free alkali, and then adding the rosin size to the paper fibres.

4. A method of sizing paper, which consists in treating acid sulphates of alumina in a beating engine of paper stock, by adding sufficient silicate of soda to produce basic sulphates, but not sufficient to make the solutions alkaline, and then adding the rosin size.

5. A method of sizing paper, which consists in converting any acid sulphates exiting in the pulp mass, into basic sulphates before adding the rosin size.

6. A method of sizing paper, which consists in adding an alkali to any paper stock that is more acid than basic sulphate of alumina, and then adding the rosin size.

In testimony whereof, I affix my signature.

JUDSON A. DE CEW.